US007563742B2

(12) United States Patent
Reyes et al.

(10) Patent No.: US 7,563,742 B2
(45) Date of Patent: Jul. 21, 2009

(54) SUPPORTED NICKEL CATALYSTS HAVING HIGH NICKEL LOADING AND HIGH METAL DISPERSION AND METHODS OF MAKING SAME

(75) Inventors: Clementine Reyes, Lawrenceville, NJ (US); Martin Fransson, Princeton, NJ (US); Horacio Treviño, Annandale, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 301 days.

(21) Appl. No.: 11/534,595

(22) Filed: Sep. 22, 2006

(65) Prior Publication Data

US 2008/0076660 A1    Mar. 27, 2008

(51) Int. Cl.
*B01J 23/40* (2006.01)
*B01J 23/74* (2006.01)
*B01J 21/18* (2006.01)
*B01J 21/00* (2006.01)
*B01J 23/00* (2006.01)

(52) U.S. Cl. .................. 502/185; 502/254; 502/259; 502/313; 502/325

(58) Field of Classification Search .............. 502/185, 502/259, 254, 313, 325, 335
See application file for complete search history.

(56) References Cited

U.S. PATENT DOCUMENTS

| | | | |
|---|---|---|---|
| 3,992,331 A | 11/1976 | Petrow et al. | 252/472 |
| 4,007,256 A | 2/1977 | Kim et al. | 423/584 |
| 4,009,252 A | 2/1977 | Izumi et al. | 423/584 |
| 4,028,274 A | 6/1977 | Kunz | 252/447 |
| 4,064,154 A | 12/1977 | Chandra et al. | 260/448.2 |
| 4,070,401 A | 1/1978 | Hirai et al. | 260/580 |
| 4,083,803 A | 4/1978 | Oswald et al. | 502/158 |
| 4,128,627 A | 12/1978 | Dyer et al. | 423/584 |
| 4,148,750 A | 4/1979 | Pine | 252/416 |
| 4,195,003 A | 3/1980 | Hurlock et al. | 524/417 |
| 4,279,883 A | 7/1981 | Izumi et al. | 423/584 |
| 4,313,806 A | 2/1982 | Dalton, Jr. et al. | 205/724 |
| 4,335,092 A | 6/1982 | Dalton, Jr. et al. | 423/584 |
| 4,336,238 A | 6/1982 | Dalton, Jr. et al. | 423/584 |
| 4,336,239 A | 6/1982 | Dalton, Jr. et al. | 423/584 |
| 4,336,240 A | 6/1982 | Moseley et al. | 423/584 |
| 4,347,231 A | 8/1982 | Michaelson | 423/584 |
| 4,347,232 A | 8/1982 | Michaelson | 423/584 |
| 4,366,085 A | 12/1982 | Ikegami et al. | 252/431 |
| 4,369,128 A | 1/1983 | Moseley et al. | 502/169 |
| 4,379,778 A | 4/1983 | Dalton, Jr. et al. | 423/584 |
| 4,476,242 A | 10/1984 | Puskas et al. | 502/185 |
| 4,503,160 A | 3/1985 | Williams, Jr. | 502/158 |
| 4,513,098 A | 4/1985 | Tsao | 502/216 |
| 4,581,344 A | 4/1986 | Ledoux et al. | 502/304 |
| 4,661,337 A | 4/1987 | Brill | 423/584 |
| 4,681,751 A | 7/1987 | Gosser | 423/584 |
| 4,701,428 A | 10/1987 | Bellussi et al. | 502/8 |
| 4,713,363 A | 12/1987 | Hucul | 502/262 |
| 4,760,187 A | 7/1988 | Kosak | 564/417 |
| 4,772,458 A | 9/1988 | Gosser et al. | 423/584 |
| 4,824,976 A | 4/1989 | Clerici et al. | 549/531 |
| 4,826,795 A | 5/1989 | Kitson et al. | 502/184 |
| 4,832,938 A | 5/1989 | Gosser et al. | 423/584 |
| 4,889,705 A | 12/1989 | Gosser | 423/584 |
| 4,937,216 A | 6/1990 | Clerici et al. | 502/62 |
| 4,937,220 A | 6/1990 | Nickols, Jr. | 502/185 |
| 4,983,558 A | 1/1991 | Born et al. | 502/31 |
| 4,996,039 A | 2/1991 | Pralus et al. | 423/584 |
| 5,017,535 A | 5/1991 | Schoonhoven | 502/30 |
| 5,024,905 A | 6/1991 | Itoh et al. | 429/44 |
| 5,061,671 A | 10/1991 | Kitson et al. | 502/185 |
| 5,096,866 A | 3/1992 | Itoh et al. | 502/101 |
| 5,104,635 A | 4/1992 | Kanada et al. | 423/584 |
| 5,128,114 A | 7/1992 | Schwartz | 423/335 |
| 5,132,099 A | 7/1992 | Hiramatsu et al. | 423/584 |
| 5,135,731 A | 8/1992 | Gosser et al. | 423/584 |
| 5,166,372 A | 11/1992 | Crocco et al. | 549/531 |
| 5,169,267 A | 12/1992 | Cowper | 406/49 |
| 5,169,618 A | 12/1992 | Maraschino | 423/584 |
| 5,180,573 A | 1/1993 | Hiramatsu et al. | 423/584 |
| 5,194,242 A | 3/1993 | Paoli | 423/584 |
| 5,214,168 A | 5/1993 | Zajacek et al. | 549/531 |
| 5,234,584 A | 8/1993 | Birbara et al. | 210/181 |
| 5,235,106 A | 8/1993 | Didillon et al. | 564/417 |
| 5,236,692 A | 8/1993 | Nagashima et al. | 423/584 |

(Continued)

FOREIGN PATENT DOCUMENTS

EP        0 864 362        9/1998

(Continued)

OTHER PUBLICATIONS

Henglein, et al., "Absorption Spectrum and Some Chemical Reactions of Colloidal Platinum in Aqueous Solution", J. Phys. Chem., 99, 14129-14136 (1995).

(Continued)

*Primary Examiner*—Patricia L Hailey
(74) *Attorney, Agent, or Firm*—Workman Nydegger

(57) ABSTRACT

Supported nickel catalyst having high nickel loading and dispersion are manufactured using a dispersing agent. The dispersing agent molecules include at least one functional group that bonds with the nickel atoms and influences nanoparticle formation. The support material is loaded with at least about 5% nickel, more preferably at least about 8%, and most preferably at least about 12% by weight of the total catalyst. Catalysts manufactured using the organic dispersing agents and loaded with the foregoing amounts of nickel have metal dispersions greater than about 5% as measured by hydrogen adsorption, more preferably greater than about 10%, and most preferably greater than about 15%.

30 Claims, No Drawings

U.S. PATENT DOCUMENTS

| | | | | |
|---|---|---|---|---|
| 5,320,821 A | 6/1994 | Nagashima et al. | | 423/584 |
| 5,338,531 A | 8/1994 | Chuang et al. | | 423/584 |
| 5,352,645 A | 10/1994 | Schwartz | | 502/262 |
| 5,362,405 A | 11/1994 | Birbara et al. | | 210/763 |
| 5,372,981 A | 12/1994 | Witherspoon | | 502/155 |
| 5,378,450 A | 1/1995 | Tomita et al. | | 423/584 |
| 5,391,531 A | 2/1995 | Ward | | 502/208 |
| 5,399,334 A | 3/1995 | Kawakami et al. | | 423/584 |
| 5,399,344 A | 3/1995 | Yang et al. | | 424/84 |
| 5,447,706 A | 9/1995 | Van Weynbergh et al. | | 423/584 |
| 5,460,734 A | 10/1995 | Birbara et al. | | 210/763 |
| 5,480,629 A | 1/1996 | Thompson et al. | | 423/584 |
| 5,496,532 A | 3/1996 | Monzen et al. | | 423/584 |
| 5,505,921 A | 4/1996 | Luckoff et al. | | 423/584 |
| 5,580,839 A | 12/1996 | Huffman et al. | | 502/338 |
| 5,583,085 A | 12/1996 | Ward | | 502/232 |
| 5,608,112 A | 3/1997 | Schwartz | | 502/338 |
| 5,641,467 A | 6/1997 | Huckins | | 423/584 |
| 5,641,723 A | 6/1997 | Bonnemann et al. | | 502/326 |
| 5,679,858 A | 10/1997 | Langer et al. | | 564/423 |
| 5,698,488 A | 12/1997 | Birbara et al. | | 502/325 |
| 5,767,036 A | 6/1998 | Freund et al. | | 502/185 |
| 5,846,895 A | 12/1998 | Gila et al. | | 502/107 |
| 5,846,898 A | 12/1998 | Chuang et al. | | 502/181 |
| 5,851,948 A | 12/1998 | Chuang et al. | | 502/314 |
| 5,859,265 A | 1/1999 | Muller et al. | | 549/531 |
| 5,900,386 A | 5/1999 | Freund et al. | | 502/330 |
| 5,912,367 A | 6/1999 | Chang | | 549/529 |
| 5,925,588 A | 7/1999 | Chuang et al. | | 502/181 |
| 5,939,220 A | 8/1999 | Gunner et al. | | 429/40 |
| 5,961,948 A | 10/1999 | Wanngard | | 423/584 |
| 5,962,365 A | 10/1999 | Langer et al. | | 502/180 |
| 5,962,741 A | 10/1999 | Baumeister et al. | | 564/417 |
| 5,965,101 A | 10/1999 | Goto et al. | | 423/584 |
| 5,972,305 A | 10/1999 | Park et al. | | 423/587 |
| 6,005,155 A | 12/1999 | Sun | | 585/640 |
| 6,042,804 A | 3/2000 | Huckins | | 423/584 |
| 6,054,507 A | 4/2000 | Funaki et al. | | 523/210 |
| 6,090,858 A | 7/2000 | El-Sayed | | 516/97 |
| 6,106,797 A | 8/2000 | Muller et al. | | 423/584 |
| 6,117,409 A | 9/2000 | Bertsch-Frank et al. | | 423/584 |
| 6,159,267 A | 12/2000 | Hampden-Smith | | 75/252 |
| 6,168,775 B1 | 1/2001 | Zhou et al. | | 423/584 |
| 6,194,338 B1 | 2/2001 | Andolfatto et al. | | 502/101 |
| 6,210,651 B1 | 4/2001 | Nystrom et al. | | 423/584 |
| 6,239,054 B1 | 5/2001 | Shukis et al. | | 502/29 |
| 6,284,213 B1 | 9/2001 | Paparatto et al. | | 423/403 |
| 6,294,696 B1 | 9/2001 | Didillon et al. | | 564/422 |
| 6,299,852 B1 | 10/2001 | Nystrom et al. | | 423/584 |
| 6,307,073 B1 | 10/2001 | Jones | | 549/532 |
| 6,316,673 B2 | 11/2001 | Giera et al. | | 564/423 |
| 6,331,500 B1 | 12/2001 | Tsuji et al. | | 502/63 |
| 6,375,920 B2 | 4/2002 | Fischer et al. | | 423/584 |
| 6,387,346 B1 | 5/2002 | Bertsch-Frank et al. | | 423/584 |
| 6,447,743 B1 | 9/2002 | Devic et al. | | 423/584 |
| 6,500,968 B2 | 12/2002 | Zhou et al. | | 549/531 |
| 6,500,969 B1 | 12/2002 | Zhou et al. | | 549/531 |
| 6,504,040 B1 | 1/2003 | Vogtel et al. | | 549/525 |
| 6,518,217 B2 | 2/2003 | Xing et al. | | 502/230 |
| 6,524,994 B1 | 2/2003 | Reesink et al. | | 502/337 |
| 6,528,683 B1 | 3/2003 | Heidemann et al. | | 562/542 |
| 6,534,440 B2 | 3/2003 | Choudhary et al. | | 502/333 |
| 6,534,661 B1 | 3/2003 | Zhou et al. | | 549/531 |
| 6,551,960 B1 | 4/2003 | Laine et al. | | 502/327 |
| 6,576,214 B2 | 6/2003 | Zhou et al. | | 423/584 |
| 6,630,118 B2 | 10/2003 | Paparatto et al. | | 423/584 |
| 6,635,348 B1 | 10/2003 | Hampden-Smith | | 428/402 |
| 6,649,140 B2 | 11/2003 | Paparatto et al. | | 423/584 |
| 6,676,919 B1 | 1/2004 | Fischer et al. | | 423/584 |
| 6,713,036 B1 | 3/2004 | VandenBussche et al. | | 423/584 |
| 6,740,615 B2 | 5/2004 | Zhou | | 502/29 |
| 6,746,597 B2 | 6/2004 | Zhou et al. | | 208/138 |
| 6,764,671 B2 | 7/2004 | Haas et al. | | 423/584 |
| 6,768,013 B1 | 7/2004 | Pujado | | 549/532 |
| 6,815,391 B2 | 11/2004 | Xing et al. | | 502/184 |
| 6,849,245 B2 | 2/2005 | Baker et al. | | |
| 6,872,377 B2 | 3/2005 | Fischer et al. | | 423/584 |
| 6,888,013 B2 | 5/2005 | Paparatto et al. | | 549/532 |
| 6,908,873 B2 | 6/2005 | Zhou et al. | | 502/29 |
| 6,953,822 B2 | 10/2005 | Locken et al. | | 524/460 |
| 7,011,807 B2 | 3/2006 | Zhou et al. | | 423/584 |
| 7,045,479 B2 | 5/2006 | Zhou et al. | | 502/125 |
| 7,048,905 B2 | 5/2006 | Paparatto et al. | | 423/584 |
| 7,060,244 B2 | 6/2006 | Devic et al. | | 423/584 |
| 2001/0024634 A1 | 9/2001 | Bertsch-Frank et al. | | 423/583 |
| 2003/0104936 A1 | 6/2003 | Mao et al. | | 502/180 |
| 2003/0180212 A1 | 9/2003 | Huckins | | 423/584 |
| 2003/0215383 A1 | 11/2003 | Escrig et al. | | 423/584 |
| 2004/0013601 A1 | 1/2004 | Butz et al. | | 423/584 |
| 2004/0037770 A1 | 2/2004 | Fischer et al. | | 423/584 |
| 2004/0081611 A1 | 4/2004 | Muller et al. | | 423/584 |
| 2004/0087441 A1 | 5/2004 | Bock et al. | | 502/339 |
| 2004/0101718 A1 | 5/2004 | Cao et al. | | 429/13 |
| 2004/0102648 A1* | 5/2004 | Borgmeier et al. | | 562/546 |
| 2004/0126312 A1 | 7/2004 | Butz et al. | | 423/584 |
| 2004/0151659 A1 | 8/2004 | Paparatto et al. | | 423/584 |
| 2004/0151660 A1 | 8/2004 | Paparatto et al. | | 423/584 |
| 2004/0184983 A1 | 9/2004 | Paparatto et al. | | 423/584 |
| 2004/0241502 A1 | 12/2004 | Chung et al. | | 428/702 |
| 2005/0009696 A1 | 1/2005 | Mao et al. | | |
| 2006/0100452 A1 | 5/2006 | Berben et al. | | 554/141 |
| 2006/0160695 A1 | 7/2006 | Zhou et al. | | |
| 2007/0244003 A1* | 10/2007 | Majima et al. | | 502/319 |

FOREIGN PATENT DOCUMENTS

| | | |
|---|---|---|
| EP | 0 978 316 | 2/2000 |
| EP | 1 160 195 | 12/2001 |
| EP | 1 160 196 | 12/2001 |
| EP | 1 277 701 | 7/2002 |
| EP | 1 308 416 | 5/2003 |
| EP | 1 344 747 | 9/2003 |
| GB | 1056125 | 1/1967 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 10324507 | 12/1998 |
| JP | 10330103 | 12/1998 |
| JP | 2003010693 | 1/2003 |
| JP | 2003024794 | 1/2003 |
| WO | WO9810863 | 3/1998 |
| WO | WO 00/59635 | 10/2000 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/083550 | 10/2002 |
| WO | WO 02/092501 | 11/2002 |
| WO | WO 02/092502 | 11/2002 |
| WO | WO 03/014014 | 2/2003 |
| WO | WO 2004078740 | 9/2004 |
| WO | 2008/036743 * | 3/2008 |

OTHER PUBLICATIONS

Li, et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", J. Phys. Chem, B, vol. 107, pp. 6292-6299 (Jun. 6, 2003).

Petroski, et al., "Kinetically Controlled Growth and Shape Formation Mechanism of Platinum Nanoparticles", J. Phys. Chem. B, 102, 3316-3320 (1998).

Zhou, et al., "Novel Synthesis of Highly Active Pt/C Cathode Electrocatalyst for Direct Methanol Fuel Cell", Chem. Commun. 2003, pp. 394-395.

Zhou, et al. "Preparation and Characterization of Anode Catalysts PtRu/C for Direct Methanol Fuel Cells", Chemical Journal of Chinese Universities, vol. 24, 2003, pp. 885-862.

Ahmadi, et al., "Shape-Controlled Synthesis of Colloidal Platinum Nanoparticles", Science, vol. 272, pp. 1924-1926 (Jun. 28, 1996).

Lordi, et al., "Method for Supporting Platinum on Single-Walled Carbon Nanotubes for a Selective hydrogenation Catalyst", Chem. Mater., vol. 13, pp. 733-737, (Feb. 10, 2001).

Chu, et al., "The partial oxidation of methane to syngas over the nickel-modified hexaaluminate catalysts $BaNi_yAL_{12-y}O_{19-\delta}$", Elsevier Applied Catalysis A: General 235, pp. 39-45, (2002).

Adesina, Adesoji A., "Hydrocarbon synthesis via Fischer-Tropsch reaction: travails and triumphs", Elsevier Applied Catalysis A: General 138, pp. 345-367, (2002).

Aksoylu, et al., "Interaction between Nickel and Molybdenum in $Ni-Mo/Al_2O_3$ catalysts: II CO hydrogenation", Elsevier Applied Catalysis A: General 168, pp. 399-407, (2002).

Aksoylu, et al., "Interaction between Nickel and Molybdenum in $Ni-Mo/Al_2O_3$ catalysts: III. Effect of impregnation strategy", Elsevier Applied Catalysis A: General 183, pp. 357-364, (2002).

Basile, et al., "Rh-Ni synergy in the catalytic partial oxidation of methane: surface phenomena and catalyst stability", Elsevier Catalysis Today 77, pp. 215-223, (2002).

Scott, et al., "Interaction between ruthenium and molybdenum in $RuMo/Al_2O_3$ catalysts", Elsevier Applied Catalysis A: General 125, pp. 71-79, (2002).

Zhu, et al., "Catalytic partial oxidation of methane to synthesis gas over $Ni-CeO_2$", Elsevier Applied Catalysis A: General 208, pp. 403-417, (2001).

Morioka, et al., "Partial oxidation of methane to synthesis gas over supported Ni catalysts prepared from Ni-Ca/Al-layered double hydroxide", Elsevier Applied Catalysis A: General 215, pp. 11-19, (2001).

Lowenthal, et al., "Surface Chemistry of $Rh-Mo/\gamma-Al_2O_3$: An Analysis of Surface Acidity", Journal of Catalysis 156, pp. 96-105, (1995).

Smith, J.S., "Comparative study of $Rh-Al_2O_3$ and $Rh-Mo-Al_2O_3$ catalysts", Chemical Engineering Science, vol. 49, Issue 24, Supplement 1, 1994, pp. 4851-4859. Chemical Reaction Engineering: Science & Technology Part A.

* cited by examiner

SUPPORTED NICKEL CATALYSTS HAVING HIGH NICKEL LOADING AND HIGH METAL DISPERSION AND METHODS OF MAKING SAME

BACKGROUND OF THE INVENTION

1. The Field of the Invention

The present invention relates to supported nickel catalysts and to the manufacture thereof. More particularly, the invention relates to catalysts and manufacturing processes for making supported nickel nanocatalysts having high nickel loading (e.g., greater than 5%) and high metal dispersion (e.g., greater than 5%), as measured by hydrogen adsorption.

2. Related Technology

Supported elemental nickel and nickel oxide catalysts have wide applications in important reactions such as methananation, hydrogenation of fats and oils, hydrocracking, and hydrodesulfurization, among others. Improvements in nickel-based catalysts can lead to improved efficiencies in these processes, thereby reducing costs and/or increasing product output.

One technique commonly used to obtain supported nickel catalysts is to begin with the nickel atoms dissolved in a solvent. The nickel atoms are usually provided as nickel salts due to the solubility of nickel salts in various solvents. The support material is added to the nickel solution and the nickel is then precipitated onto the support, typically by adding a base. The supported nickel catalyst is then dried and calcined (e.g., at 375° C.) and activated by reduction with hydrogen.

It is known in the art that heating and/or calcining the catalyst atoms causes agglomeration of catalyst particles to some degree. Agglomeration is undesired because it reduces the performance of the catalyst. Agglomerated particles have less exposed surface area and are consequently less active for a given amount of metal (i.e., only the exposed metal atoms on the surface are available for catalysis). Despite the undesirability of agglomeration, exposing the catalyst to heat is often necessary to activate the catalyst or for carrying out the reactions that involve the catalyst.

The extent of agglomeration during manufacture or use of the catalyst typically depends on the size and number of catalyst particles. Smaller particles are more likely to agglomerate because of higher surface tension compared to larger particles. Higher metal loading also tends to facilitate agglomeration because the particles are in closer proximity. Although catalyst performance can in theory be increased with smaller catalyst particles, improvement in catalyst performance has been somewhat limited by the inability to beneficially increase metal loading while using small catalyst particles.

BRIEF SUMMARY OF THE INVENTION

The present invention provides methods for manufacturing supported nickel catalyst with high metal loadings (e.g., greater than 5% by weight) while also having good catalyst dispersion. The nickel catalysts include a dispersing agent (e.g., adipic acid) that allows the nickel catalyst to be loaded on a support in higher amounts while maintaining or improving metal dispersion.

The catalysts are manufactured from a solution of nickel atoms dissolved in a solvent. The nickel atoms are reacted with a dispersing agent that includes at least one functional group (e.g., a carboxylic acid group) that can bond to the nickel atoms. Once the nickel atoms are bonded with the dispersing agent molecules, the nickel atoms are allowed to or caused to form nanoparticles (e.g., by reducing the catalyst atoms with hydrogen). Before or after nanoparticle formation, the nickel atoms are dispersed on a support material in amounts greater than 5% by weight of the catalyst.

In a preferred embodiment, the organic dispersing agent includes at least two functional groups. One functional group is able to bond to the catalyst atoms and the second functional group is able to bond with a support material. Suitable functional groups for bonding with the catalyst atoms and the support material include one or more of a hydroxyl, a carboxyl, a carbonyl, an amine, an amide, a nitrile, a nitrogen with a free lone pair of electrons, an amino acid, a thiol, a sulfonic acid, a sulfonyl halide, or an acyl halide.

Preferred organic dispersing agents include one or more of adipic acid, oxalic acid, malic acid, malonic acid, maleic acid, succinic acid, glycolic acid, lactic acid, glucose, citric acid, EDTA, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, sulfonated polyethylene terephthalate, or combinations thereof.

In an exemplary embodiment, the reaction of the dispersing agent and the nickel atoms is carried out at a pH greater than 7.0, more preferably greater than 7.5, and most preferably greater than 8.0. The pH of the reaction mixture is selected and maintained by adding a base to the reaction mixture.

In an exemplary embodiment, the base reacts with the nickel atoms to form a plurality of nickel complexes. The base is selected to provide an inorganic ligand (e.g., ammonium) that forms a complex with the nickel atoms. The complexed nickel atoms then react with the organic dispersing agent. The complexed nickel atoms tend to be more reactive to the organic dispersing agent, which facilitates the bonding between the nickel atoms and the dispersing agent. Nickel nanoparticles formed in this manner have shown a lower incidence of metal leaching and metal precipitation before being loaded on the support.

In one embodiment, the base used to form the nickel complex comprises a solution of ammonium carbonate and ammonium hydroxide (($NH_4)_2CO_3/NH_4OH$). Surprisingly, it has been found that the ratio of $(NH_4)_2CO_3$ to $NH_4OH$ can affect the metal dispersion of the nanocatalyst. In a preferred embodiment, the ratio of ammonium carbonate to ammonium hydroxide is greater than 1:1, more preferably greater than 2:1, and most preferably greater than 3:1.

By dispersing the catalyst atoms with the organic dispersing agent and optionally bonding the organic dispersing agent to the support material, the nickel atoms can be loaded on the catalyst support material in greater quantities while maintaining or improving metal dispersion. The supported nickel catalysts of the present invention provide the advantage of both high metal loading (e.g., at least about 5% wt.) and high metal dispersion (e.g., at least 5% dispersion, as measured by hydrogen adsorption). Improved loading and dispersion is achieved even after activation and/or use of the catalyst at elevated temperatures (e.g., greater than 100° C.).

These and other advantages and features of the present invention will become more fully apparent from the following description and appended claims as set forth hereinafter.

DETAILED DESCRIPTION OF THE PREFERRED EMBODIMENTS

I. Introduction

The present invention is directed to methods for manufacturing supported nickel nanocatalysts having high nickel loading and high metal dispersion. The nickel nanoparticles are formed using an organic dispersing agent. The dispersing agent molecules used to manufacture the nickel nanoparticles include at least one functional group that is capable of bonding to the nickel atoms and optionally includes a functional group capable of bonding to the surface of the support material. The catalyst nanoparticles are loaded on the support in an amount greater than about 5% by weight of the catalyst, more preferably greater than about 8 wt %, and most preferably greater than about 12 wt %.

For purposes of the present invention, the weight percent of the nickel is based on the total dry weight of the catalyst (e.g., the weight of the metal and the support material, but not the solvent).

For purposes of the present invention, the term "particle size" refers to median particle size.

II. Components Used to Make Nanoparticles

A. Catalyst Atoms

The catalyst atoms are predominantly nickel atoms that can bond with the dispersing agent molecules. The nickel atoms can be provided as the elemental metal or as a metal salt. Nickel salts are typically preferred for their solubility in solvents. Examples of suitable nickel compounds that can be used in the present invention include $NiCl_2$, $Ni(NO_3)_2$, $NiSO_4$, $NiCO_3$, $Ni(OH)_2$, hexamine nickel, and nickel oxalate. Many of the foregoing are typically provided in a hydrated form.

The nickel atoms can be used alone or in combination with a minority metal. The minority metal can be any element or group of elements that can exhibit catalytic activity and bond with the dispersing agent molecules. These include elements or groups of elements that exhibit primary catalytic activity, as well as promoters and modifiers. Exemplary minority metals include base transition metals, noble metals, alkali metals, alkaline earth metals, and rare earth metals used alone or in combination. The minority metals can be provided as metal salts or as the elemental metal.

In an exemplary embodiment, the catalyst includes a minority amount of molybdenum. The presence of molybdenum can be beneficial for reducing fouling of the catalyst during use.

B. Organic Dispersing Agents

The organic dispersing agent is selected to promote the formation of nickel nanocatalyst particles that have a desired size, stability, and/or uniformity. Typically the dispersing agent molecules react with the catalyst atoms to form organic ligands complexed with the catalyst atoms.

Dispersing agents suitable for bonding the catalyst atoms include a variety of small organic molecules, polymers and oligomers. The dispersing agent interacts and bonds with catalyst atoms dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the dispersing agent molecules and the catalyst atoms, the dispersing agent molecules include at least one functional group capable of bonding to the catalyst atoms. Optionally, the dispersing agent molecules can include functional groups capable of bonding to the support material.

In one embodiment, the functional groups comprise a carbon atom bonded to at least one electron-rich atom that is more electronegative than the carbon atom and that is able to donate one or more electrons so as to form a bond or attraction with a catalyst atom. Preferred dispersing agents include functional groups which have either a charge or one or more lone pairs of electrons that can be used to complex a metal catalyst atom. These functional groups allow the dispersing agent to have a strong binding interaction with the catalyst atoms.

In an exemplary embodiment, the functional groups of the dispersing agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be bifunctional or polyfunctional.

Useful bifunctional dispersing agents include diacids such as adipic acid, oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional dispersing agents include sugars such as glucose, polyfunctional carboxylic acids such as citric acid, EDTA, pectins, cellulose, and the like. Other useful dispersing agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The dispersing agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the dispersing agent, it can also be advantageous to control the molar ratio of dispersing agent to the catalyst atoms in a catalyst suspension. A more useful measurement is the molar ratio between dispersing agent functional groups and catalyst atoms. For example, in the case of a divalent metal ion two molar equivalents of a monovalent functional group would be necessary to provide the theoretical stoichiometric ratio. Typically the molar ratio of dispersing agent functional groups to catalyst atoms is preferably in a range of about 0.001:1 to about 50:1, more preferably in a range of about 0.005:1 to about 10:1, and most preferably in a range of about 0.01:1 to 3:1.

The dispersing agent allows for the formation of very small and uniform nanoparticles. In general, the nanocatalyst particles formed in the presence of the dispersing agent are preferably less than about 20 nm in size. In some cases, the nanocatalyst particles may be atomically dispersed. The nanocatalyst particles more preferably have an average particle size less than about 15 nm and most preferably less than about 10 nm.

Finally, depending on the desired stability of the nanocatalyst particles on the support material, the dispersing agent can be selected to covalently bond with the support material so as to anchor or tether the nanocatalyst particles and/or atoms to the support material. While the dispersing agent has the ability to inhibit agglomeration of the nanocatalyst particles in the absence of anchoring, chemically bonding the nanocatalyst particles to the support material through a dispersing agent type of ligand is a particularly effective mechanism for preventing agglomeration.

Suitable functional groups for bonding with the support are the same types of functional groups as those suitable for bonding to the catalyst atoms. However, dispersing agent molecules can have different functional groups for bonding to the support and bonding to the catalyst atoms.

C. Solvents

The nickel catalyst atoms are prepared in a solution that can be applied to the support material. The solution can contain various solvents, including water and organic solvents. Solvents participate in catalyst formation by providing a solution for the interaction of catalyst atoms and the dispersing agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

D. Basic Compounds and Inorganic Ligands

A basic compound can added to the reaction mixture nickel atoms and dispersing agent molecules to adjust the pH to an alkaline pH. The addition of the base is useful to prevent nickel atoms complexes and/or nickel nanoparticles from precipitating out of solution before adsorption onto the support material. Examples of suitable bases include ammonium hydroxide, ammonium carbonate, sodium hydroxide, ammonium hydrogen phosphate, ammonium acetate, and combinations of these.

The base can be used as a source of inorganic ligands for forming nickel complexes. Nickel atoms complexed with an inorganic ligand are typically more reactive to the organic dispersing agent molecules. Examples of suitable inorganic ligands include hydroxyl, amine, chloride, nitrate, sulfate, and carbonate.

E. Support Materials

The nickel nanocatalyst particles are formed or deposited on a catalyst support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

In a preferred embodiment the surface area of the support is at least about 50 $m^2/g$, more preferably 100 $m^2/g$, and most preferably 150 $m^2/g$.

III. Methods of Making Nickel Nanocatalysts

The general process for manufacturing the supported nickel catalyst is as follows. First, a solution of nickel atoms (e.g., in the form of a ground state metal or metal salt) is prepared. A second solution comprising one or more types of organic dispersing agent molecules (e.g., in the form of a carboxylic acid salt) is also prepared. In some cases, the organic dispersing agent may need to be dissolved into the solvent (e.g., water) by adding a base. For example, dissolving adipic acid in water can be accomplished by adjusting the pH to greater than about 8.0 by adding a base such as ammonium hydroxide or a combination of bases.

Next, the dispersing agent molecules are allowed or caused to react with the nickel atoms. This reaction is carried out by mixing the solution of nickel atoms with the solution of organic dispersing agent molecules.

The reaction of the nickel atoms with the dispersing agent molecules is typically carried out at a pH greater than about 7.0 (i.e., alkaline). In a preferred embodiment, the pH during the reaction between the dispersing agent and the nickel atoms is greater than about 7.5, more preferably greater than about 8.0, and most preferably greater than about 8.3.

To achieve an alkaline pH, a base is typically added to the reaction mixture. In an exemplary embodiment, the base provides an inorganic ligand that reacts with the nickel to form a nickel complex (e.g., a nickel ammonium complex). Forming a nickel complex with an inorganic ligand can be advantageous because it can make the nickel atoms more reactive to the organic dispersing agent molecules, thereby ensuring bonding between the nickel atoms and the organic dispersing agent molecules. Lower amounts of metal leaching from the catalyst have been observed selecting a base or inorganic ligand that improves the reactivity between the nickel atoms and dispersing agent molecules.

The base can be used in the process of the present invention for various purposes. As mentioned, the base can be added to provide an inorganic ligand for complexing the nickel atoms. In addition, the base can be added to reduce or inhibit precipitation of the nickel complexes and/or nanoparticles. Maintaining an alkaline pH, and particularly a pH greater than 8.0 can reduce or prevent precipitation of the nickel atoms and/or nanoparticles, thereby facilitating adsorption of the nickel onto the catalyst support material.

In an exemplary embodiment, the base added to the reaction mixture is a solution of ammonium carbonate and ammonium hydroxide. This basic solution has been found to provide particularly good results for metal dispersion in the catalysts of the present invention. Surprisingly, solutions of ammonium carbonate and ammonium hydroxide provide improved metal dispersion as the ratio of ammonium carbonate to ammonium hydroxide is increased. In a preferred embodiment, the ratio of ammonium carbonate to ammonium hydroxide is greater than about 1:1, more preferably greater than about 2:1, and most preferably greater than about 3:1.

The base can be added at any time during or prior to reacting the dispersing agent molecules with the catalyst atoms. Furthermore, the base can be added in multiple steps, and different bases can be added simultaneously or in different reaction steps to accomplish one or more of the above mentioned benefits of adding base.

Next, the nickel atoms bonded to the dispersing agent molecules are allowed or caused to form nickel nanoparticles in solution or on a support material. Prior to or after the nickel nanoparticles form, the nickel atoms are loaded on the support material. For purposes of the present invention the term "deposited on" includes nickel atoms or particles deposited within the pores of the support material.

The nickel nanocatalyst particles are deposited on the support material by soaking the support material in the solution of nickel atoms or nickel nanoparticles until the nickel atoms and/or nickel nanoparticles are adsorbed onto the support material. The support material is selected to have a surface area that accommodates adsorption of the desired metal loading. Those skilled in the art are familiar with selecting supports having a surface area suitable for adsorbing particular amounts of metal.

The metal loading on the support material is selected by adjusting the ratio of metal in solution to the weight of support material being soaked in the solution of nickel nanocatalyst. The nanoparticles of the present invention can be deposited on the support material with a large metal loading while achieving a surprisingly high metal dispersion. In a preferred embodiment, the metal loading of nickel is greater than about 5% by weight of the dry catalyst, more preferably greater than about 8% and most preferably greater than about 12%. These metal loadings can be achieved with greater than about 5% dispersion as measured by hydrogen absorption, more preferably greater than about 10% and most preferably greater than about 15% metal dispersion. In some embodiments of the present invention, greater than 10% metal loading with greater than 25% dispersion has been achieved. This is a substantial improvement over many known nickel catalyst in the prior art which typically achieve 1%-2% dispersion with metal loadings of 10%-20%.

Importantly, the foregoing metal loadings and dispersion is achieved even upon calcining, drying, or using the catalyst at temperatures about 100° C. High metal loading coupled with high metal dispersion using the methods of the present invention have even been achieved for catalysts that have been calcined at temperatures about 500° C.

The nickel nanocatalysts of the present invention can optionally include a minority metal. The minority metal is incorporated into the nanocatalyst by forming a solution of minority metal atoms and mixing the solution of minority metal atoms with the nickel atoms during the reaction with the dispersing agent molecules. Reacting the minority metal atoms in the reaction mixture with the nickel atoms ensures proper dispersion of the minority metal.

In a preferred embodiment, the support material is advantageously calcined prior to depositing the nickel atoms or nanoparticles on the support. The support material can be calcined, for example, at a temperature in of 525° C. for 3 hours. Calcining the catalyst support before supporting the nickel on the support causes the smaller pores in the support to melt or sinter closed. It is advantageous to close these pores before loading the support with nickel so that nickel will not become trapped in the pores, which may occur if the nickel is loaded into such pores before calcining. Calcining the support prior to loading the nickel onto the support can have a substantially beneficial effect on metal dispersion and catalytic activity.

The order in which the dispersing agent is applied to the support and reacted with the catalyst atoms can be varied. As mentioned above, the dispersing agent and catalyst atoms can first be reacted together and then deposited on the support material where the dispersing agent can then react with the support material. This embodiment can be useful where improved dispersion is obtained by first forming the bond between the catalyst atoms and the dispersing agent molecules. For example, in some cases, it may be desirable for the functional group that are to react with the catalyst atoms to be first reacted with the catalyst atoms without being exposed to the functional groups on the support material. In an alternative embodiment, it may be advantageous to first react the dispersing agent molecules with the support and then react the catalyst atoms with the dispersing agent molecules. In this embodiment, the support can provide a template for forming the nanoparticles.

During formation of the catalyst nanoparticles, some or most of the dispersing agent molecules can be removed from the nickel atoms to allow the nickel atoms to become catalytically active. For example, during a reduction step some of the dispersing agent molecules may be removed. However, in a preferred embodiment at least some of the dispersing agent molecules remain to bond the nanoparticles to the support and/or to maintain metal dispersion.

In addition, it may be preferable to select a dispersing agent that will cause the catalyst atoms to crystallize to form nanoparticles having a desired crystal face exposure. Examples of dispersing agents that yield supported catalyst particles having a predominantly (111) crystal face exposure include small molecules and branched polymers or oligomers, examples of which are disclosed in U.S. Pat. No. 6,746,597. Examples of dispersing agents that yield supported catalyst particles having a predominantly (110) crystal face exposure include straight-chained polymers or oligomers, examples of which are disclosed in U.S. Pat. No. 7,011,807. For purposes of disclosing how to select a dispersing agent in order to yield supported nanocatalyst particles having a desired crystal face exposure, the foregoing U.S. patents are incorporated by reference.

IV. EXAMPLES

The following examples provide formulas for making nickel nanocatalyst according to the present invention.

Example 1

Nickel Catalyst

Example 1 describes the preparation of a nickel catalyst using a dispersing agent to achieve high nickel loading and high metal dispersion. 35 g of alumina extrudates (Sud-Chemie, CS332) with a surface area of 200-300 $m^2$/g were soaked in methanol and placed in a water bath at 55° C. for 3 hrs. The methanol was then decanted off.

A solution of adipic acid was prepared by dissolving 17.5 g of adipic acid in 300 mL of water. To dissolve the adipic acid in water, the pH of the solution was adjusted from 2.8 to 9.0 using a solution of $(NH_4)_2CO_3/NH_4OH$ in a ratio of 0.1:1, 1.4:1, 2.4:1, and 3.6:1 w/w. The nickel solution was prepared by dissolving 28.35 g $NiCl_2.6H_2O$ in 500 ml of distilled water. This complex readily dissolved in water without adjusting the pH, which was generally in a range of 5.5-6.5.

Using a pump set to 0.5 mL/min, the nickel solution was added to the adipic acid solution. During the addition of the nickel solution to the adipic acid solution, the pH was adjusted several times to maintain a pH of about 8.3.

The support material was impregnated by adding the catalyst mixture at a rate of 0.5 mL/min. The extrudates began to turn green almost immediately. After 24 hrs the deep blue color disappeared leaving only a slight tinge of color in the solution. That indicated that most of the nickel was deposited onto the support. At this point, the mixture was filtered and the extrudates were washed with distilled water three times and dried in the oven at 85° C. The nickel metal was reduced by placing the extrudates in a reduction unit at 565° C. for 2 hours.

Example 2

Nickel-Molybdenum Catalyst

Example 2 describes the preparation of a nickel-molybdenum catalyst using an organic dispersing agent to achieve high nickel loading and high metal dispersion. 35 g of alumina extrudates (Sud-Chemie, CS332, surface area 200-300 $m^2/g$) were soaked in methanol and placed in a water bath at 55° C. for 3 hrs. The methanol was then decanted off.

A solution of adipic acid was prepared by dissolving 19.67 g of adipic acid in 300 mL of water. To dissolve the adipic acid in water, the pH of the solution was adjusted from 2.8 to 9.0 using a solution of $(NH_4)_2CO_3/NH_4OH$ in a ratio of 0.7:1, 1.4:1, 2.4:1, and 3.6:1 w/w. The nickel solution was prepared by dissolving 28.35 g $NiCl_2.6H_2O$ in 200 ml of distilled water. This complex readily dissolved in water without adjusting the pH, which was generally in a range of 5.5-6.5. A molybdenum solution was prepared by dissolving 2.58 g of $(NH_4)_6Mo_7O_{24}.4H_2O$ in 300 mL of water. The pH of the molybdenum solution was between 5.0 and 5.4.

Using a pump set to 0.5 mL/min, the molybdenum solution was added to the adipic acid, and the resulting mixture was stirred at room temperature for 1 hour. Addition of the nickel solution to the adipic acid-molybdenum mixture was also done using the same pump rate. During the addition of the nickel solution to the acid-molybdenum solution, the pH was adjusted several times to maintain a pH of about 8.3.

The support material was impregnated by adding the catalyst mixture at a rate of 0.5 mL/min. The extrudates began to turn green almost immediately. After 24 hrs the deep blue color disappeared leaving only a slight tinge of color in the solution. At this point, the mixture was filtered and the extrudates were washed with distilled water three times and dried in the oven at 85° C. The nickel metal was reduced by placing the extrudates in a reduction unit at 565° C. for 3 hours. Thereafter, the extrudates were washed with warm water to eliminate the chloride ions present. This step was repeated several times until the waste water showed no presence of chloride ions when tested with silver nitrate. The extrudates were then dried overnight in an oven at 80° C. under nitrogen.

Example 3

Nickel Catalyst

Example 3 describes the preparation of a nickel catalyst using an organic dispersing agent and $Ni(NO_3)_2$. Example 3 was carried out using the same method as Example 1 except 50 g of alumina extrudates (Sud-Chemie CS332, surface area 200-300 $m^2/g$) were used and the nickel compound was $Ni(NO_3)_2$.

Example 4

Nickel Catalyst

Example 4 describes the preparation of a nickel catalyst using an organic dispersing agent and a pre-calcined catalyst support material. 50 g of alumina extrudates (Sud-Chemie CS332, surface area 200-300 $m^2/g$) were placed in a crucible and heated to a temperature of 525° C. for 3 hours under nitrogen. The support was then placed in a desiccator. The method of Example 4 was carried out the same as in Example 3, except that the pre-calcined support was used.

Example 5

Nickel Catalyst

Example 5 describes the preparation of a nickel catalyst using an organic dispersing agent and $Ni(NO_3)_2$. Example 5 was carried out using the same method as Example 1 except 50 g of alumina extrudates (Sud-Chemie CS331-4, surface area 200-300 $m^2/g$) were used and the nickel compound was $Ni(NO_3)_2$.

Example 6

Nickel Catalyst

Example 6 describes the preparation of a nickel catalyst using an organic dispersing agent and a pre-calcined catalyst support material. 50 g of alumina extrudates (Sud-Chemie CS331-4, surface area 200-300 $m^2/g$) were placed in a crucible and heated to a temperature of 525° C. for 3 hours under nitrogen. The support was then placed in a desiccator. The method of Example 6 was carried out the same as in Example 5, except that the pre-calcined support was used.

Examples 7-10

In examples 7-10, the method of Example 1 was performed using a solution of ammonium carbonate and ammonium hydroxide as a base. The ratio of ammonium carbonate to ammonium hydroxide was varied in Examples 7-10 as indicated in Table 1. Table 1 also provides the particle size, metal surface area, and metal dispersion for each of Examples 7-10.

Examples 11-14

In Examples 11-14, the method of Example 2 was carried out using a solution of ammonium carbonate and ammonium hydroxide as a base. The ratio of ammonium carbonate to ammonium hydroxide was varied in Examples 11-14 as indicated in Table 1. Table 1 also provides the particle size, metal surface area, and metal dispersion for each of Examples 11-14.

Examples 15-18

In Examples 15-18, the methods of Example 3-6 respectively were carried out using a solution of 85:15 ammonium carbonate to ammonium hydroxide as a base % v/v. Table 1 provides the particle size, metal surface area, and metal dispersion for each of Examples 15-18.

The metal dispersion for each catalyst was measured by hydrogen adsorption using known methods, which indicates the amount of nickel that is exposed and available for catalysis.

TABLE 1

| | | | Particle Size | | ICP | | | H2-Chemisorption | |
| | | | Gamma | Alfa | | | | Metal | Metal |
| Example # | Source of Ni | Ratio of (NH$_4$)$_2$CO$_3$/NH$_4$OH | alumina [nm] | alumina [nm] | Ni [nm] | Ni [%] | Mo [%] | surface area [m$^2$/g] | dispersion [%] |
|---|---|---|---|---|---|---|---|---|---|
| 7 | NiCl$_2$ | 50:50 | 82.7 | 5.5 | 5.5 | 15.1 | 0.0 | 11.1 | 11.0 |
| 8 | NiCl$_2$ | 75:25 | 84.3 | 5.5 | 5.5 | 14.9 | 0.0 | 14.1 | 14.2 |
| 9 | NiCl$_2$ | 85:15 | 93.4 | 5.5 | 5.7 | 15.2 | 0.0 | 15.1 | 14.9 |
| 10 | NiCl$_2$ | 90:10 | 84.5 | 5.6 | 5.8 | 15.1 | 0.0 | 14.4 | 14.3 |
| 11 | NiCl$_2$ | 50:50 | 78.7 | 5.6 | 5.6 | 14.7 | 1.48 | 8.58 | 8.76 |
| 12 | NiCl$_2$ | 75:25 | 85.7 | 5.4 | 5.8 | 15.3 | 0.86 | 12.2 | 11.9 |
| 13 | NiCl$_2$ | 75:25 | 82.5 | 5.3 | 5.6 | 15.2 | 0.76 | 11.2 | 11.0 |
| 14 | NiCl$_2$ | 85:15 | 86.7 | 5.8 | 4.1 | 15.0 | 0.44 | 14.7 | 14.7 |
| 15 | Ni(NO$_3$)$_2$.6H$_2$O | 85:15 | ND* | ND | ND | 11.10 | 0.0 | 18.52 | 25.04 |
| 16 | Ni(NO$_3$)$_2$.6H$_2$O | 85:15 | ND | ND | ND | 10.90 | 0.0 | 19.5 | 26.83 |
| 17 | Ni(NO$_3$)$_2$.6H$_2$O | 85:15 | ND | ND | ND | 8.98 | 0.0 | 16.95 | 28.33 |
| 18 | Ni(NO$_3$)$_2$.6H$_2$O | 85:15 | ND | ND | ND | 10.30 | 0.0 | 16.77 | 24.33 |

*ND = not determined

Examples 19-22

Examples 19-22 describe the preparation of a nickel catalyst using a dispersing agent to achieve high nickel loading and high metal dispersion. The method used in Examples 19-21 was the same as in Example 1 except that the dispersing agent used was glycolic acid, malonic acid, citric acid, and tartaric acid, respectively. The base used to adjust the pH was NH$_4$OH. The method of Example 22 was the same as Example 1 except that tartaric acid was used as the dispersing agent and the base used was NaOH. In each of Examples 19-22 at least some metal was adsorbed onto the support material.

The method of manufacturing catalysts according to the present invention advantageously provides small catalyst particles and allows for high metal loading accompanied by high surface area and metal dispersion. As shown in the examples, nickel catalysts with 10%-15% nickel loading and 11%-15% surface area/metal dispersion were achieved repeatedly using the process of the present invention. The small particle size and level of metal dispersion is particularly significant since both are maintained during sintering at over 500° C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A supported nickel nanocatalyst, comprising,
   a catalyst support material;
   a plurality of catalyst nanoparticles comprised of nickel dispersed on the support material; and
   a plurality of dispersing agent molecules bonded to the plurality of nanoparticles and optionally to the support material,
   wherein the catalyst nanoparticles provide a nickel loading on the support material of at least about 5% by weight and a metal dispersion of at least about 5%, as measured by hydrogen adsorption.

2. A supported nickel nanocatalyst as in claim 1, wherein the nickel loading is greater than about 8% by weight.

3. A supported nickel nanocatalyst as in claim 1, wherein the nickel loading is greater than about 12% by weight.

4. A supported nickel nanocatalyst as in claim 1, wherein the metal dispersion is greater than about 10%, as measured by hydrogen adsorption.

5. A supported nickel nanocatalyst as in claim 1, wherein the metal dispersion is greater than about 15%, as measured by hydrogen adsorption.

6. A supported nickel nanocatalyst as in claim 1, in which the dispersing agent molecules are bonded to the catalyst nanoparticles by at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

7. A supported nickel nanocatalyst as in claim 1, in which the support material comprises one or more of carbon black, graphite, silica, alumina, zeolite, metal oxide, or polymer.

8. A supported nickel nanocatalyst as in claim 1, in which the catalyst nanoparticles further comprise molybdenum.

9. A method for manufacturing a supported nickel-containing nanocatalyst, comprising:
   (i) providing a catalyst support material;
   (ii) providing a solution comprised of nickel atoms;
   (iii) providing a solution comprised of dispersing agent molecules, each having at least one functional group capable of bonding with the nickel atoms;
   (iv) reacting the nickel atoms with the dispersing agent molecules and causing or allowing the nickel atoms to form nickel-containing catalyst nanoparticles; and
   (v) loading the nickel atoms and/or catalyst nanoparticles on the catalyst support material in an amount so as to provide a nickel loading of at least about 5% by weight of the catalyst, exclusive of solvent.

10. A method as in claim 9, in which the reaction of the nickel atoms with the dispersing agent is carried out in a solution having a pH greater than 7.0.

11. A method as in claim 9, in which (iv) is performed before step (v).

12. A method as in claim 9, in which (v) is performed before step (iv).

13. A method as in claim 9, in which the dispersing agent molecules comprise at least one type of functional groups capable of bonding to the support material.

14. A method as in claim 13, in which the functional group capable of bonding to the support comprises at least one member selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

15. A method as in claim 9, in which the support material comprises one or more of carbon black, graphite, silica, alumina, zeolite, metal oxide, or polymer.

16. A method as in claim 9, in which the solution of nickel atoms and the solution of dispersing agent molecules comprise a solvent selected from the group consisting of water, methanol, ethanol, n-propanol, isopropyl alcohol, acetonitrile, acetone, tetrahydrofuran, dimethylformamide, dimethylsulfoxide, methylene chloride, and combinations thereof.

17. A method as in claim 9, in which the organic dispersing agent comprises at least one member selected from the group consisting of adipic acid, oxalic acid, malic acid, malonic acid, maleic acid, succinic acid, glycolic acid, lactic acid, glucose, citric acid, EDTA, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, and sulfonated polyethylene terephthalate.

18. A method as in claim 9, wherein the catalyst is dried, calcined, or used in a catalytic reaction at a temperature greater than 100° C.

19. A dispersed supported nickel nanocatalyst manufactured according the method of claim 9.

20. A method for manufacturing a supported nickel nanocatalyst, comprising:
   (i) providing a catalyst support material;
   (ii) providing a plurality of nickel atoms;
   (iii) providing a plurality of organic dispersing agent molecules, each having at least one functional group capable of bonding with a nickel atom;
   (iv) forming a plurality of nickel complexes by reacting the nickel atoms with an inorganic ligand;
   (v) reacting the nickel complexes with the dispersing agent molecules in a solution having a pH greater than 7.0 to bond the dispersing agent to the nickel atoms;
   (vi) causing or allowing the nickel atoms bonded to the dispersing agent to form nickel-containing catalyst nanoparticles; and
   (vii) loading the nickel atoms and/or catalyst nanoparticles on the catalyst support material in an amount so as to provide a nickel loading of at least about 5% by weight of the catalyst, exclusive of solvent.

21. A method as in claim 20, further comprising calcining the support material prior to loading the nickel atoms or nickel nanoparticles thereon.

22. A method as in claim 20, in which the inorganic ligand is selected from the group consisting of ammonium, hydroxide, chloride, nitrate, sulfate, carbonate, and combinations thereof.

23. A method as in claim 20, in which the inorganic ligand is provided using a base.

24. A method as in claim 23, wherein the base comprises a solution of ammonium carbonate and ammonium hydroxide.

25. A method as in claim 24, wherein the ratio of ammonium carbonate to ammonium hydroxide is greater than about 2:1.

26. A method as in claim 24, wherein the ratio of ammonium carbonate to ammonium hydroxide is greater than about 3:1.

27. A method as in claim 20, in which the pH of the solution is greater than about 7.5.

28. A method as in claim 20 in which the pH of the solution is greater than about 8.0.

29. A method as in claim 20, in which the at least one functional group is selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

30. A method as in claim 20, in which the nickel is loaded on the catalyst support in an amount greater than 12% by weight of the final catalyst.

* * * * *

UNITED STATES PATENT AND TRADEMARK OFFICE
CERTIFICATE OF CORRECTION

PATENT NO. : 7,563,742 B2
APPLICATION NO. : 11/534595
DATED : July 21, 2009
INVENTOR(S) : Reyes et al.

It is certified that error appears in the above-identified patent and that said Letters Patent is hereby corrected as shown below:

Column 1
Line 48, change "can in theory" to --can, in theory,--

Column 7
Line 27, change "catalyst" to --catalysts--
Line 47, remove [in] after "temperature"

Column 10
Line 37, change "examples" to --Examples--
Line 58, change "Example 3-6" to --Examples 3-6--

Column 12
Line 36, before "an acyl halide" delete "and" and insert --and combinations thereof-- after "acyl halide"

Signed and Sealed this

Sixth Day of July, 2010

David J. Kappos
*Director of the United States Patent and Trademark Office*